(12) United States Patent
Butera et al.

(10) Patent No.: US 6,659,631 B2
(45) Date of Patent: Dec. 9, 2003

(54) VEHICLE HEADLAMP WITH SHAPE MEMORY ADJUSTING MEANS

(75) Inventors: Francesco Butera, Turin (IT); Bartolomeo Pairetti, Barge (IT); Alessandro Zanella, Strada Turin (IT)

(73) Assignee: C.R.F. Societa Consortile Per Azioni, Turin (IT)

( * ) Notice: Subject to any disclaimer, the term of this patent is extended or adjusted under 35 U.S.C. 154(b) by 0 days.

(21) Appl. No.: 10/120,580

(22) Filed: Apr. 12, 2002

(65) Prior Publication Data

US 2002/0149947 A1 Oct. 17, 2002

(30) Foreign Application Priority Data

Apr. 13, 2001 (IT) ...................................... TO2001A0362

(51) Int. Cl.[7] .............................................. F21V 17/02
(52) U.S. Cl. ........................ 362/513; 362/278; 362/320
(58) Field of Search ................................ 362/513, 278, 362/320, 512, 277, 319, 276, 268, 521, 331

(56) References Cited

U.S. PATENT DOCUMENTS

| 4,345,303 | A | * | 8/1982 | Gerard ........................ 362/268 |
| 4,369,488 | A | * | 1/1983 | Brun ........................... 362/268 |
| 5,068,768 | A | * | 11/1991 | Kobayashi .................... 362/268 |
| 5,138,540 | A | * | 8/1992 | Kobayashi et al. .......... 362/268 |
| 6,059,428 | A | * | 5/2000 | Perlo et al. .................. 362/268 |

* cited by examiner

*Primary Examiner*—Sandra O'Shea
*Assistant Examiner*—Bao Q. Truong
(74) *Attorney, Agent, or Firm*—Sughrue Mion, PLLC

(57) ABSTRACT

A vehicle headlamp having two glass panes carrying an array of micro-lenses that can be moved relative to each other both along the optical axis of the headlamp and along a direction orthogonal to the optical axis. These movements are controlled via a number of shape memory actuators.

7 Claims, 3 Drawing Sheets

VEHICLE HEADLAMP WITH SHAPE MEMORY ADJUSTING MEANS

BACKGROUND OF THE INVENTION

The present invention concerns a vehicle headlamp of the type that includes:

- a support structure,
- a light source mounted on the support structure,
- a first thin transparent pane placed in a fixed position in front of the light source, and on which a number of micro-lenses are integrated with a matrix-like layout,
- a second thin transparent pane facing the said first pane and separated from it, on which a number of micro-lenses are also integrated in a matrix-like fashion, such that for each micro-lens of the first pane there are one or more corresponding micro-lenses on the second pane, forming a subgroup of the matrix of the second pane, the said first pane and the said second pane being capable of movement with respect to each other in a direction that is substantially parallel to the optical axis of the headlamp and perpendicular to these panes, as well as in a direction that is orthogonal to it.
- the headlamp also includes first actuator means for controlling movement in the direction of the optical axis and second actuator means for controlling the said movement in a direction orthogonal to the optical axis.

A headlamp of the above-indicated type is described and illustrated in European patent application EP-A-0 860 650 presented by the Applicant. In this known device, it is possible to change the characteristics of the light beam generated by the headlamp without the need for macroscopic movement of the mobile part of the headlamp. In fact, each minute relative movement between the two panes carrying the micro-lens arrays allows a different micro-lens of the second pane to be selectively aligned with each micro-lens of the first pane. In the case of the known device, the adjustment movement is achieved via traditional types of actuators, where each one includes an electric motor and a nut and lever mechanism for example.

SUMMARY OF THE INVENTION

The object of this invention is that of perfecting the previously proposed device, rendering it much simpler, lighter, less bulky and more efficient.

In order to achieve this objective, the subject of the invention is a vehicle headlamp of the type indicated at the beginning of this description, characterized in that the said first and second actuator means are constituted by shape memory actuators.

Shape memory actuators are known devices in themselves, which have found application in various fields. They make use of elements composed of metal alloys, typically nickel and titanium alloys, which possess the property of contracting when the temperature exceeds a predetermined transition value. The Applicant has already proposed various applications for shape memory actuators, such as for the adjustment of vehicle rear-view mirrors, or the adjustment of deflector plates in air conditioners for motor vehicles and similar for example. For instance, a shape memory actuator could be composed of a wire made of a shape memory material that is placed between a fixed structure and the controlled organ. Heating the wire beyond its transition temperature, which can be achieved by passing an electrical current through the wire for example, causes the wire to shorten and thus move the controlled organ in a first direction. The controlled organ returns to its initial position when the wire cools down, and this can be aided by providing an elastic means of return.

This invention refers to a specific application of shape memory actuators of the aforementioned type to a vehicle headlamp possessing the characteristics that have been indicated at the beginning of this description.

In a preferred form of embodiment, the headlamp in accordance with the invention includes a number of first shape memory actuators acting in the direction of the headlamp's optical axis and which are positioned between a mobile pane of the headlamp and the fixed support structure. In addition, at least one other shape memory actuator is provided along the direction orthogonal to the optical axis to control movement of the mobile pane of the headlamp assembly in this direction.

The application of shape memory actuators has various advantages. First of all, in the headlamp in accordance with the invention, it is essential that any adjustment movement be effected without changing the parallelism between the two panes carrying the micro-lenses. In the headlamp in accordance with the invention, the said shape memory actuators are directly connected to the mobile pane of the device. Thus, each of them directly controls the position of the mobile pane in space and, since a positional transducer is associated with each actuator, typically a potentiometer that supplies a feedback signal to the control system relative to the position reached by the portion of the pane directly controlled by the actuator, the electronic control system that commands the various actuators is capable of checking in an extremely simple manner that the condition of parallelism between the two panes is maintained. This advantage derives from the possibility of providing at least two, typically three or four, shape memory actuators for adjustments along the optical axis, a situation that was not possible to realize in a device in line with known techniques due to the significant bulk of traditional actuators.

In a preferred form of embodiment, each of the shape memory actuators acting in the direction of the optical axis includes a wire having one end connected to the controlled pane and the other end connected to the tip of a sheath through which a shape memory wire passes and which has its other end anchored to the fixed structure. The device also includes an intermediate portion of telescopic tubular wire guide, through which the shape memory wire passes, and which is connected respectively, in an articulated manner, to a support mounted on the controlled pane and to the headlamp's fixed support structure. These articulated connections ensure that the controlled pane can also be moved in a direction orthogonal to the direction of the headlamp's optical axis, or rather in a direction within the plane of the pane, in addition to the possibility of moving in a direction perpendicular to the plane of the pane.

BRIEF DESCRIPTION OF THE DRAWINGS

Further characteristics and advantages of the invention will become clear from the description that follows, supplied merely as a non limitative example and with reference to the enclosed drawings, where.

DETAILED DESCRIPTION OF THE INVENTION

Figure 1:
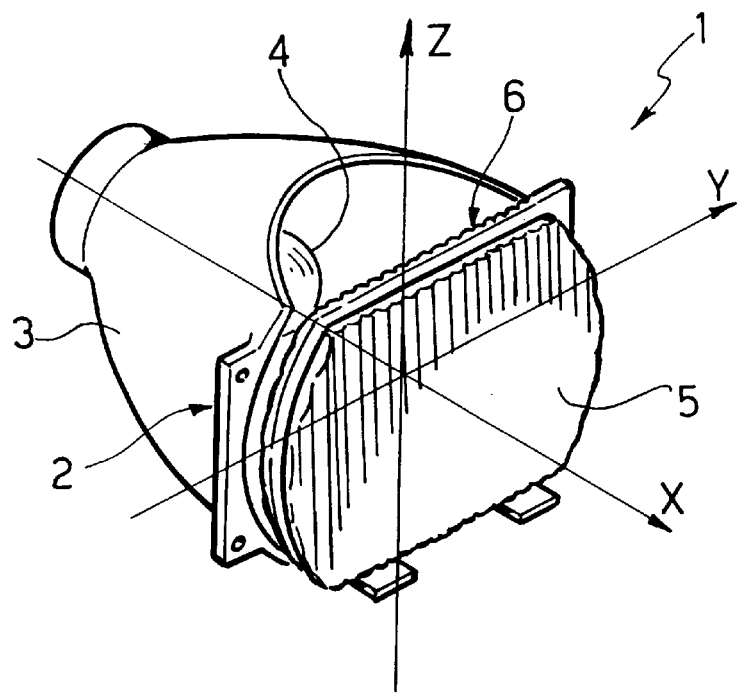
FIG. 1 is a schematic perspective view of a headlamp in accordance with the invention.

In FIG. 1, reference number 1 indicates a vehicle headlamp assembly, including a fixed support structure 2, carrying a reflector 3 that surrounds a light source constituted by a lamp 4. A first transparent pane 5 carrying a number of micro-lenses is placed in front of the lamp 4, and a second pane 6 is placed facing it, this pane also carrying as number of micro-lenses or micro-optics, arranged so that there is corresponding subgroup of micro-lenses or micro-optics on pane 6 for each micro-lenses or micro-optic on pane 5. In the illustrated example, pane 5 is rigidly connected to the fixed support structure 2, while pane 6 is capable of moving with respect to pane 5 in the direction of the headlamp's optical axis x, or rather in a direction perpendicular to the two panes 5 and 6, whilst keeping the two panes 5 and 6 parallel to each other. In addition, pane 6 is capable of being moved with respect to pane 5 in the direction y, orthogonal with respect to the optical axis x.

Figure 2:
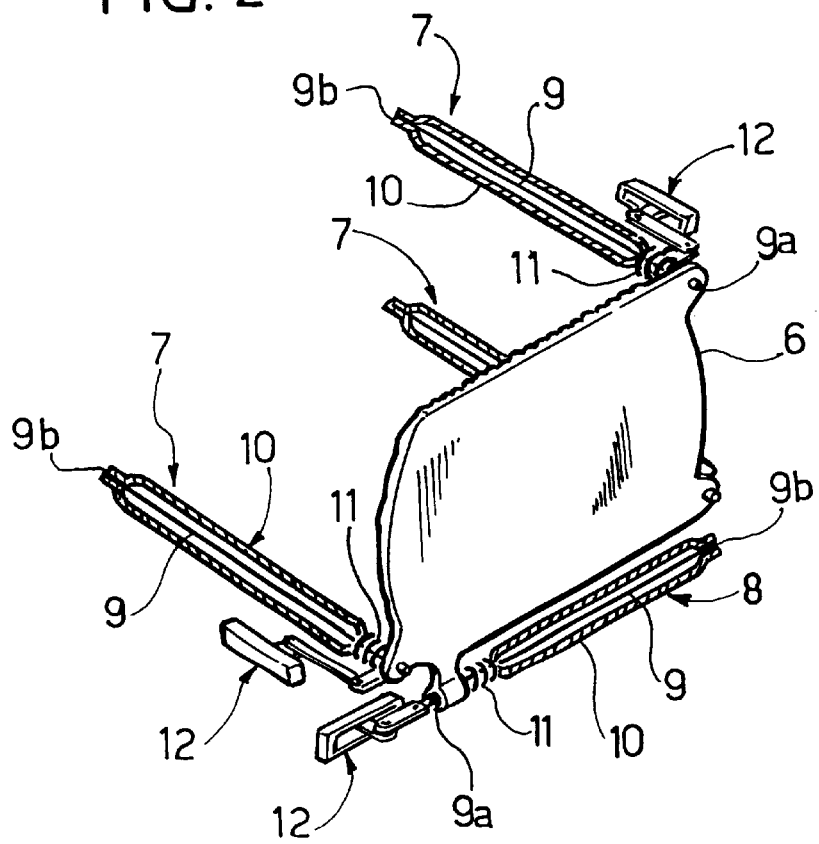
FIG. 2 is a larger scale, partial perspective view of part of the headlamp shown in FIG. 1.

With reference to FIG. 2, the movements of the mobile pane 6 (which is shown on its own in FIG. 2) are controlled by four shape memory actuators 7 (only three of which are visible in FIG. 2) for motion in the x direction and a shape memory actuator 8 for motion in the y direction. Generally speaking, each of these actuators is realized using a wire 9 made of a shape memory material, with one end 9a connected to the pane 6 and the other end 9b connected the tip of a sheath 10 that surrounds the wire 9 and the opposite end of which is anchored to the fixed support structure. In addition, a spring 11 that aids return of the shape memory wire to its elongated rest condition is associated with each shape memory wire 9, as well as a potentiometer 12 with an electrical track carried on the fixed support structure, cooperating with a cursor that moves with the shape memory wire to generate an electrical output signal indicating the position of each actuator.

Figure 3:
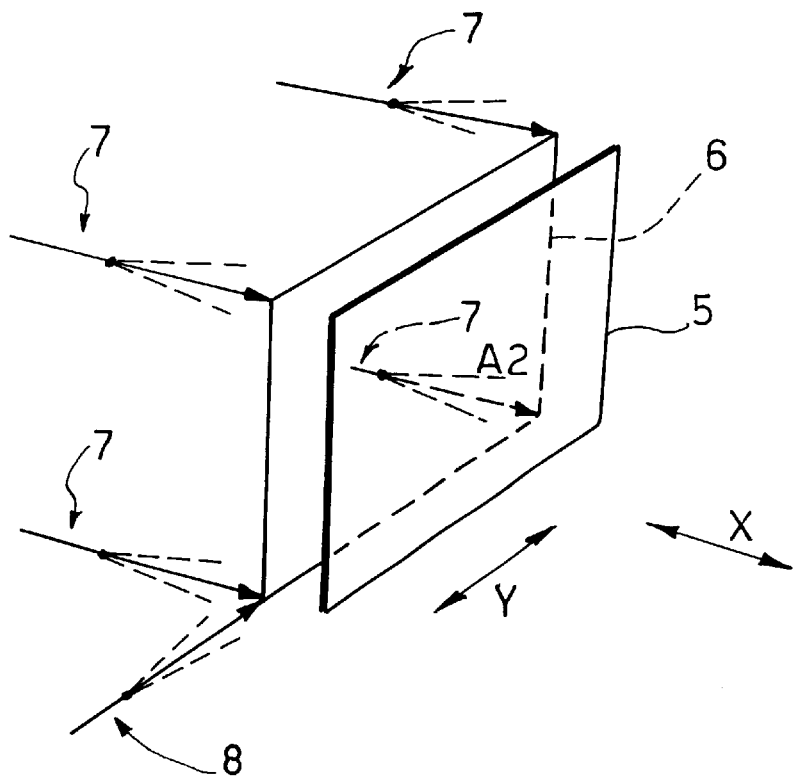
FIG. 3 is a schematic view of the two panes of the headlamp shown in FIG. 1.

FIG. 3 schematically illustrates the two panes 5 and 6 with the five actuators 7 and 8 (in the case of FIG. 3, actuator 8 is positioned laterally and external to the pane instead of beneath it). As can be seen in FIG. 3, the transverse movements of pane 6 controlled by actuator 8 are permitted due to the flexibility of the shape memory wires that form the actuators 7 (see dashed lines).

Figure 4:
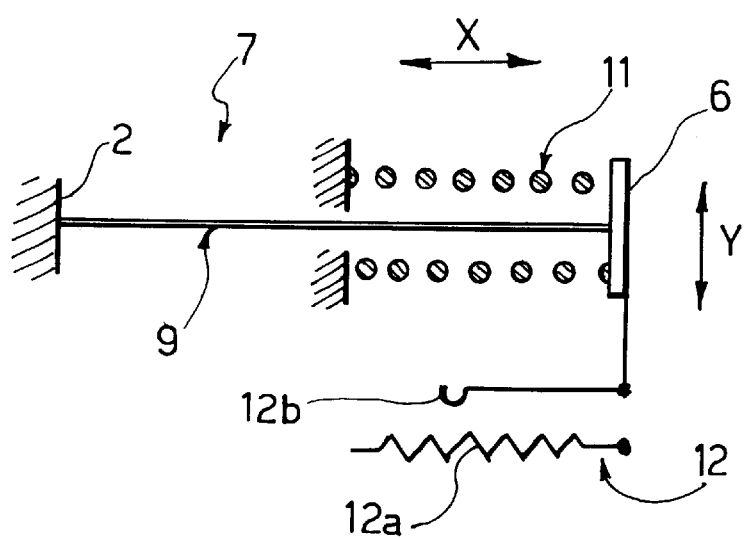
FIG. 4 is a schematic view of each shape memory actuator that forms part of the headlamp.

FIG. 4 schematically illustrates the structure of a shape memory actuator 7, with the shape memory wire 9 positioned between the pane 6 to be controlled and the fixed support structure 2. Heating of the shape memory wire 9, which is achieved by passing an electrical current, causes the wire 9 to shorten, thus provoking a movement of the pane 6 in the x direction, to the left in FIG. 4, against the action of the return spring 11. During this motion, due to the cooperation between the fixed track 12a and the cursor 12b, which is integral with the controlled organ, the potentiometer 12 sends a signal indicating the position of the actuator.

Figure 5:
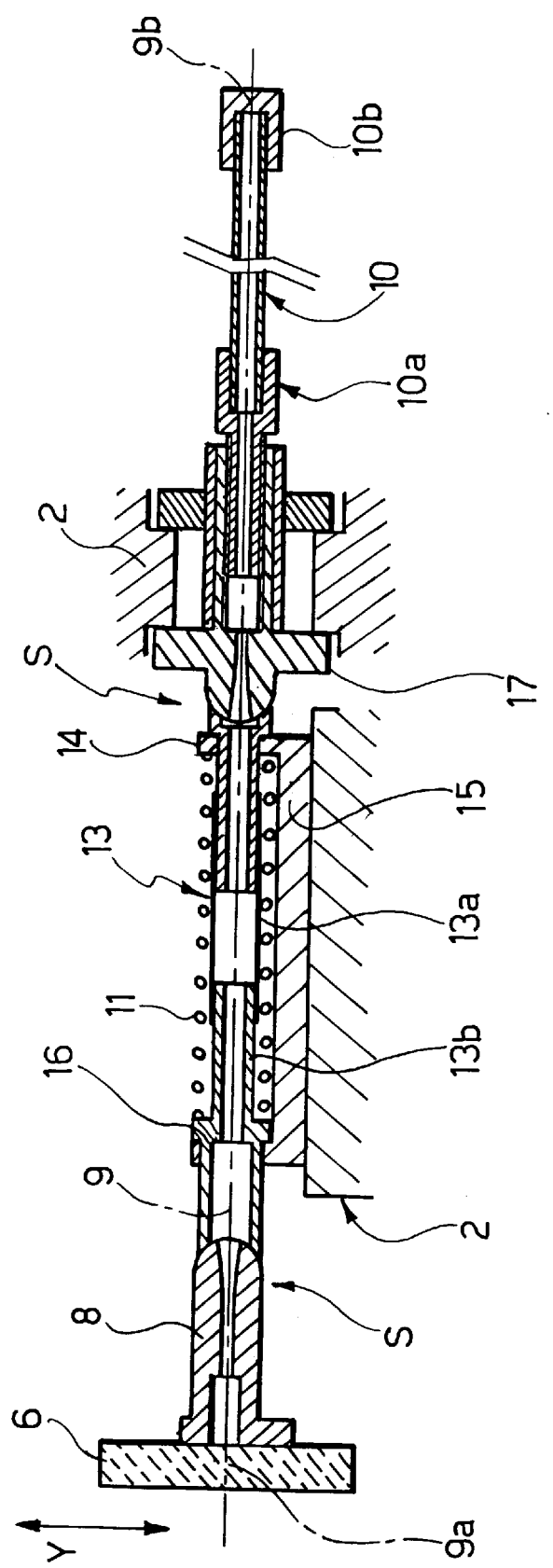
FIG. 5 is a preferred form of embodiment of one of the actuators used in the headlamp in accordance with the invention.

FIG. 5 illustrates a material form of embodiment for the shape memory actuators 7 used to control movement in the direction of the optical axis x. As has already been said, the shape memory actuator essentially includes a wire 9 made of a shape memory material. One end of this wire is anchored to the pane 6 to be controlled, whilst the other end 9b is anchored to the tip 10b of the sheath 10 (only partially illustrated in FIG. 5). The opposite end 10a of the sheath 10 is anchored to the fixed support structure 2 of the headlamp on the real wall of the latter. In consequence, the sheaths 10 of the four actuators 7 extend beyond the back of the headlamp structure, as a certain length must be assured for each shape memory wire 9 to guarantee its correct operation. Alternatively, the sheaths 10 that protrude out the back of the headlamp can be bent and held in a space-saving arrangement, without affecting correct operation of the actuator. A second sheath 10-A, of an electrically insulated and heat resistant material covers the shape memory wire for the purposes of avoiding short circuits. The sheaths 10 can be realized using steel wire wound in a spiral with the coils touching to give axial rigidity and lateral flexibility. Always with reference to FIG. 5, the shape memory wire 9 is guided in the vicinity of pane 6 inside a telescopic tubular guide 13, composed of two elements, 13a and 13b, mounted with one sliding inside the other. The telescopic tubular guide 13 shortens when the shape memory wire 9 contracts during activation of the actuator, simultaneously loading the return spring 11 that is positioned between the flange 14 of a support 15 connected to the fixed structure 2 of the headlamp and a connecting element 16, operatively connected to the pane 6.

In addition, as can be seen in FIG. 5, the intermediate guide 13 has its ends connected respectively, in an articulated manner (S-joints), to a support 17 forming part of the fixed support structure of the headlamp and a support 18 connected rigidly to the controlled pane 6. In the illustrated example, these joints are obtained by coupling complementary spherical surfaces. Due to this arrangement, whenever the pane 6 moves transversally in the y direction, this movement is permitted because support 18 is connected to the pane and moves with it, while support 17 remains in a fixed position, since it is connected to the structure 2. The transverse movement of the pane is permitted due to the provision of S-joints at the ends of the intermediate telescopic guide 13, as well as to the flexibility of the wire 9.

The guide parts for the shape memory wire are preferably made of PTFE, both for the capacity of this material to smoothly guide the wire and for its heat resistance. FIG. 5 does not show the potentiometer that is associated with the shape memory wire 9 and that can be realized as shown in FIG. 2 or, in any case, according to the drawing shown in FIG. 4.

Naturally, the principle of the invention being understood, the constructional details and forms of embodiment could be extensively changed with respect to that described and illustrated, by way of example, without leaving the scope of this invention.

What is claimed is:

1. A vehicle headlamp, comprising:
    a fixed support structure;
    a light source mounted on the support structure,
    a thin transparent pane placed in a fixed position in front of the light source, and on which a number of micro-lenses are integrated with a matrix-like layout,
    a second thin transparent pane facing the first pane and separated from the first pane, on which a number of micro-lenses are also integrated in a matrix-like fashion, such that for each micro-lens of the first pane there are one or more corresponding micro-lenses on the second pane, forming a subgroup of the matrix of the second pane,
    the second pane being mobile in a direction parallel to the optical axis of the headlamp, and also in a direction orthogonal to the optical axis, the headlamp also including a first actuator means for controlling the movement of the second pane in the direction parallel to the optical axis of the headlamp and second actuator means for controlling the movement of the second pane in the direction orthogonal to the optical axis, wherein the first and second actuator means include shape memory actuator means.

2. A headlamp according to claim 1, wherein the first actuator means includes a number of shape memory actuators, each one including an elongated shape memory element with one end connected directly to the said second pane and the other end connected to the fixed support structure of the headlamp.

3. A headlamp according to claim 2, wherein a transducer device is associated with each shape memory actuator and for the purposes of generating an electrical output signal indicating the position of the shape memory actuator.

4. A headlamp according to claim 3, wherein a return spring is associated with each shape memory actuator and which draws the shape memory actuator towards a rest condition.

5. A headlamp according to claim 1, wherein each shape memory actuator includes a shape memory wire having one end connected to the controlled pane and the opposite end connected to the tip of a flexible sheath, the opposite end of which is anchored to the fixed support structure.

6. A headlamp according to claim 5, wherein each of the shape memory actuators and that control movement of the second pane in the direction parallel to the optical axis include a telescopic tubular guide for the shape memory wire, connected in an articulated manner at one end to the controlled pane and at the other to the fixed support structure, to permit the ends of the shape memory wire to move out of alignment following a movement of the controlled pane in the direction orthogonal to the optical axis.

7. A headlamp according to claim 3, wherein the transducer is composed of a potentiometer, including an electrical track carried on the fixed support structure of the headlamp and a cursor that moves with the shape memory wire spring.

* * * * *